US010320943B2

(12) United States Patent
Venkatesh

(10) Patent No.: US 10,320,943 B2
(45) Date of Patent: Jun. 11, 2019

(54) GEOGRAPHY BASED HTML5 CONTENT REDIRECTION

(71) Applicant: Dell Products L.P., Round Rock, TX (US)

(72) Inventor: Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 195 days.

(21) Appl. No.: 14/812,642

(22) Filed: Jul. 29, 2015

(65) Prior Publication Data

US 2017/0034304 A1 Feb. 2, 2017

(51) Int. Cl.
H04L 29/08 (2006.01)
H04L 29/06 (2006.01)

(52) U.S. Cl.
CPC .............. H04L 67/34 (2013.01); H04L 67/02 (2013.01); H04L 67/327 (2013.01); *H04L 67/42* (2013.01)

(58) Field of Classification Search
CPC ......... H04L 67/02; H04L 67/34; H04L 67/42; H04L 67/327; G06F 15/16
USPC ......................................... 709/203; 715/234
See application file for complete search history.

(56) References Cited

U.S. PATENT DOCUMENTS

| 2007/0143827 | A1* | 6/2007 | Nicodemus ......... G06F 21/6218 726/2 |
| 2010/0281107 | A1* | 11/2010 | Fallows .................... G06F 9/54 709/203 |
| 2012/0151371 | A1* | 6/2012 | Kominac .......... G06F 17/30905 715/740 |
| 2013/0138649 | A1* | 5/2013 | Broberg ............ G06F 17/30215 707/736 |
| 2014/0344332 | A1* | 11/2014 | Giebler ............... H04L 67/2823 709/203 |
| 2015/0046792 | A1* | 2/2015 | Lee ..................... G06F 17/2247 715/234 |
| 2015/0127722 | A1* | 5/2015 | Feng ................... H04L 67/2823 709/203 |
| 2015/0149186 | A1* | 5/2015 | Rao ........................ G10L 19/008 704/500 |
| 2016/0225017 | A1* | 8/2016 | Wong ................. G06Q 30/0247 |
| 2016/0241617 | A1* | 8/2016 | Jelley ................ G06F 17/30017 |
| 2017/0111452 | A1* | 4/2017 | Thazhathethil ..... H04L 12/4633 |

\* cited by examiner

*Primary Examiner* — Tesfay Yohannes
(74) *Attorney, Agent, or Firm* — Baker Botts L.L.P.

(57) ABSTRACT

Certain information and data, such as HTML5 content, may be stored at a cloud server. A client may establish a connection with the server whereupon the server redirects the HTML5 content to the client. The HTML5 content may not be accessible by the client due to geographic or other location restrictions on placed on the HTML5 content. The client may request that the server fetch the desired HTML5 content from the source whereupon the server transmits the encoded HTML5 content to the client. The client renders the encoded HTML5 content. The client receives seamless HTML5 content redirection irrespective of geography and website.

17 Claims, 12 Drawing Sheets

GEOGRAPHY BASED HTML5 CONTENT REDIRECTION

FIELD

The disclosure relates in general to client-server computer systems, and more particularly to determining if redirected hypertext extensive markup language (HTML) 5 content is available and if not, fetching the redirected HTML5 content.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

One such information handling system is a thin client. A user of a thin client information handling system may initiate a remote desktop protocol (RDP) session with a server via any remote desktop protocol client application executing on the client computing device (for example, Microsoft Remote Desktop Protocol, Citrix Independent Computing Architecture, VMware Personal Computer over Internet Protocol, etc.). Hypertext extensive markup language (HTML)5 redirection may happen on any of these aforementioned desktop protocols, including Teradici PCOIP (Personal Computer Over Internet Protocol).

HTML5 redirection redirects HTML5 contents from a server to a thin client. The HTML5 content is presented locally at the thin client. The HTML5 contents, for example, are played at the thin client at the same position where the redirected content was playing at the server. In this way, the HTML5 redirection is transparent to the user in that the user is not aware from where the HTML5 content is playing from or even when or if it has been redirected.

Problems exist, however, with websites that host HTML5 content. One problem is that of geography restrictions. A provider of HTML5 content on a website may have restrictions imposed that limit the distribution of content based on geography. That is, the provider may only be permitted to distribute content within a specified territory or geography. For example, Netflix and YouTube may not run United States programming in other countries unless first granted such geographical rights.

Second, content may be accessible in multiple geographic locations but is excluded in other geographic locations. For example, YouTube may be accessible from the United States and India but no accessible in China. The HTML5 content redirection of certain websites may not be distributed or played on a given thin client when the server is in one geographic location and the thin client is in another geographic location. For example, a hosted desktop server data center may be located in Hong Kong but the thin client connection to the Cloud is from a hosted desktop in China. From Hong Kong, the server hosted desktop websites are available but when the same content is redirected, the thin client in China cannot fetch the redirected HTML5 content because of geographic restrictions.

Further, some users and client devices may operate in a fully secured network environment that places restrictions on network connections, for example, restrictions may be placed on HTTP and HTTPS connections. The present invention overcomes these previous problems with redirected HTML5 content.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1A:
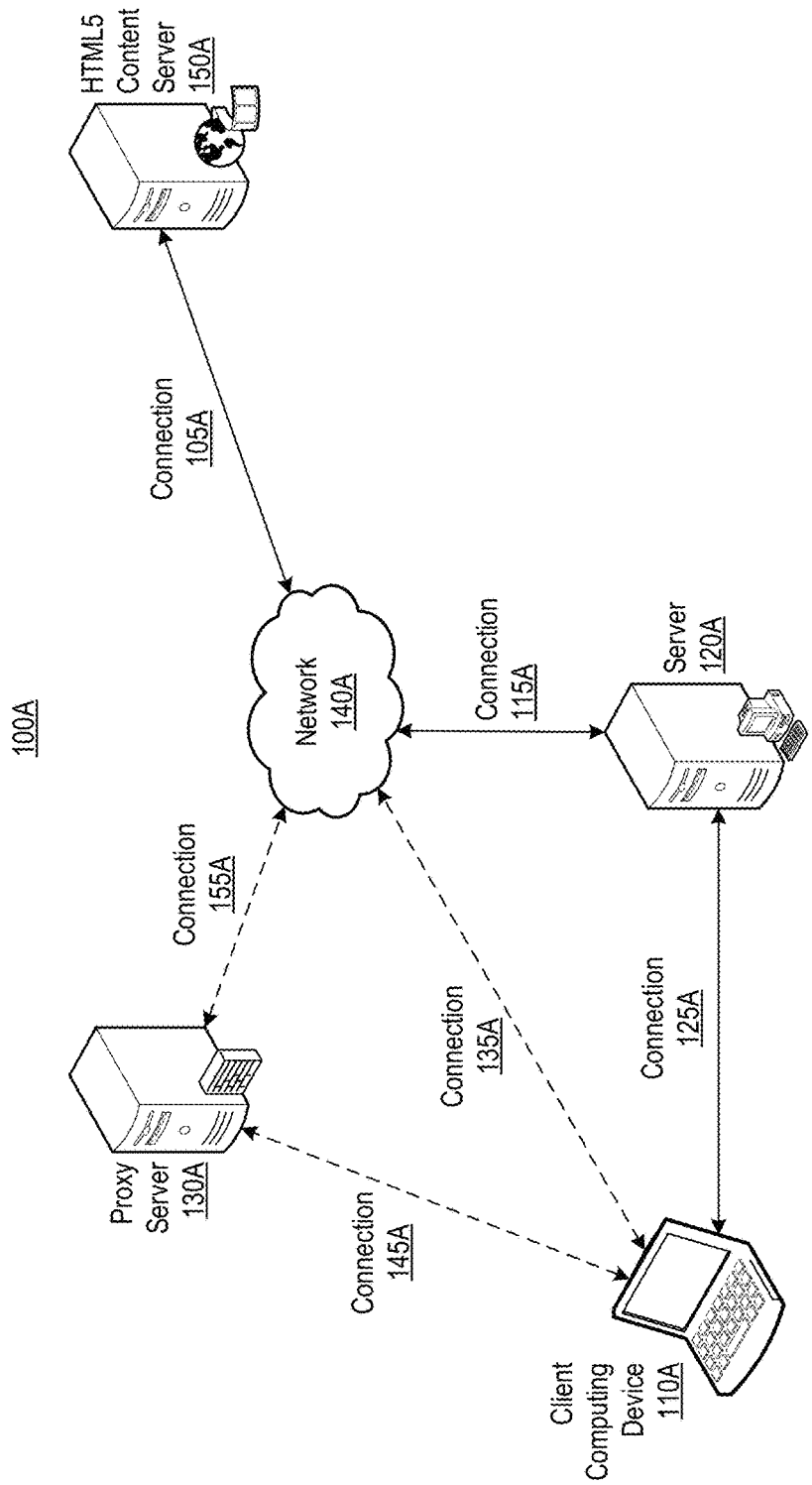
FIG. 1A is a block diagram illustrating an example of a first system for presenting HTML5 content.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

A user of a client computing device may initiate a remote desktop protocol session with a server via a remote desktop protocol client application executing on the client computing device. The remote desktop protocol may be, for example, Microsoft Remote Desktop Protocol® (RDP), Citrix Independent Computing Architecture® (ICA), VMware VMview, VMware Remote Desktop Protocol, VMware Personal Computer Over Internet Protocol (PCOIP), Teradici PCOIP or any other protocol known to one or ordinary skill in the art. The user may instantiate a web browser on the server and data from the web browser may be displayed on the client computing device (such as a thin client) via the remote desktop protocol client application. The web browser may display a webpage that includes HTML5 content.

In some examples, a computer program product may transmit to the client computing device all HTML5 content of a webpage or, alternatively, user-selected HTML5 content of the webpage. The HTML5 content may be rendered at the server and transmitted to the client computing device via the remote desktop protocol. Alternatively, the computer program product may redirect the HTML5 content to the client computing device for downloading the HTML5 content at the client computing device via an Internet connection of the client computing device and for rendering on the client computing device.

In some examples, the decision to redirect HTML5 content may be manual. A compatibility list listing which HTML5 content items are rendered on the server and which HTML5 content items are rendered on the client may be provided. In some examples, one or more specific software programs may be required on the client computing device. In other examples, the software programs may not be required on the client computing device. In some examples, Internet connectivity at the client computing device may be required. In other examples, Internet connectivity at the client computing device may not be required. In some examples of the compatibility list approach, a server (for example, a login server) may fetch data from listed website(s) and pass the data back to the client, for example, via a tunnel.

The present disclosure may, in particular embodiments, be supported in multiple web browsers (for example, Internet Explorer® versions 6, 7, 8, 9, and/or web browser implementing Netscape Plugin Application Programming Interface (NPAPI), such as Chrome® and Mozilla Firefox® and any other browsers known to one of ordinary skill in the art that support the handling of HTML5 content) and on multiple platforms (for example, Windows or Linux). HTML5 content may be supported by the present disclosure in particular embodiments.

Particular embodiments include, but are not limited to: (1) HTML5 content redirection, (2) HTML5 content redirection via proxy server if the client computing device is not directly connected to the Internet but is connected to the Internet via a proxy server, (3) HTML5 content redirection with a tunneling server (which may be the same as the remote desktop protocol server) if the client computing device does not have access to the Internet either directly or via the proxy server, and/or (5) selective redirection of HTML5 content item(s) on a webpage.

HTML5 content redirection may work with any web browsers known to one of ordinary skill in the art. In particular embodiments, under seamless HTML5 redirection, all the HTML5 content of a page may be redirected to the client, as illustrated, for example, in FIG. 1B.

If the proxy server is not present in the network, then HTML5 tunneling (see, for example, FIG. 2A or 2B) may happen through the login server (for example, remote desktop protocol server 120A or 208B).

In particular embodiments, a user may selectively redirect HTML5 content on a website at the server. As a result, the user may avoid redirecting the HTML5 content items which are not of his/her interest, for example, advertisements. This may be achieved, for example, by the user selecting (for example, single clicking via a mouse, double clicking via a mouse, or touching via a touch screen) on the HTML5 content item. This mechanism is called tapping. Once the user taps a particular HTML5 content item on a website, the content items may be redirected. When the user opens the website on a subsequent occasion, particular embodiments may detect the tapped HTML5 content and start redirecting the HTML5 to clients (for example, thin clients) automatically, such that the user does not need to tap the desired HTML5 content item(s) again. In some examples, by default all the HTML5 content items may be rendered at the server and the HTML5 content item(s) may be redirected to client by tapping.

HTML5 redirection at the client may include checking for access to an outside network (for example, the Internet). If the client has access to the outside network, the client may fetch the data directly for the browser. If the client does not have access to the outside network, the client may look for an external proxy and forward all the requests of its browser to the proxy server. If an external proxy is not found, the client may query the server through tunneling. The tunneling server (which may be the same machine as the remote desktop protocol server) may fetch the data and pass back to the client. The tunneling server may act like a pass through server. The tunneling server may forward the client requests to the actual server (the remote desktop protocol server) and pass back the response to client. If tunneling is used and the server is over a wide area network (WAN), WAN Accelerator/Optimizer may be used to improve the performance.

FIG. 1A illustrates an example of a first system 100A for presenting HTML5 content. As shown, the system 100A includes a client computing device 110A, a server 120A, a proxy server 130A, and a HTML5 content server 150A. One or more of the client computing device 110A, the server 120A, the proxy server 130A, and the HTML5 content server 150A (for example, web server) may be connected to a network 140A (for example, the Internet). While FIG. 1 includes only a single client computing device 110A, server 120A, proxy server 130A, and HTML5 content server 150A, particular embodiments may be implemented in conjunction with one or more client computing devices, servers, proxy servers, or HTML5 content servers. In some aspects, particular embodiments may be implemented without one or more of the above-listed components (for example, without a proxy server 130A).

The client computing device 110A may be a laptop computer, a desktop computer, a mobile phone, a tablet computer, a personal digital assistant (PDA), or any similar device. As illustrated, the client computing device is connected to the server 120A via a connection 125A. The connection 125A may be a remote desktop protocol connection. The client computing device 110A may include a web browser for displaying HTML5 content or a remote desktop protocol client application. One example of the client computing device 110A is described in detail in conjunction with FIG. 4.

A remote desktop protocol connection may, among other things, allow for visual data from the server 120A to be displayed remotely on the client computing device 110A. The client computing device 110A may be able to cause execution of software application(s) residing on the server 120A. A remote desktop connection may use a remote desktop protocol. Example remote desktop protocols include Microsoft Remote Desktop Protocol® (RDP), Citrix Independent Computing Architecture® (ICA), and VMware VMview®.

In one example, the connection 125A between the client computing device 110A and the server 120A is independent of the network 140A. For example, the network 140A may be the Internet, and the client computing device 110A may be connected to the server 120A via one or more of a local network, a corporate intranet, a direct wired connection, or a direct wireless connection. Alternatively, the client computing device 110A may be connected to the server 120A via a connection 125A (for example, a remote desktop protocol connection) over the network 140A.

The server 120A may be a remote desktop protocol server. In some aspects, the server may be an enterprise computer (for example, an office desktop computer) that is configured to be accessed remotely (for example, from an employee's home or a field office) via a remote desktop protocol. Alternatively, the server 120A may be implemented as a server farm including multiple machines, a single machine with a single processor, or a multi-processor machine. One example of the server 120A is described in detail in conjunction with FIG. 3.

In some examples, the client computing device 110A may be connected to the network 140A directly via a connection 135A. The connection 135A may be a hypertext transfer protocol (HTTP) or hypertext transfer protocol secure (HTTPS) connection. In some examples, the client computing device 110A may be connected to the network 140A via the proxy server 130A. The connection 145A between the client computing device 110A and the proxy server 130A may be a HTTP or HTTPS connection, and the connection 155A between the proxy server 130A and the network 140A may be a HTTP or HTTPS connection. In some aspects, the client computing device 110A may not be connected to the network 140A except via the server 120A. The connection 115A of the server 120A to the network 140A may be a HTTP connection.

The proxy server 130A may be configured to allow a computer (for example, a client computing device 110A) connecting to the proxy server 130A to connect to the network 140A. The proxy server 130A may be configured to filter out some content (for example, webpages) to prevent users of computers connected to the network 140A via the proxy server 130A from accessing that content. For example, in an enterprise setting, an employer may use the proxy server 130A to prevent its employees from accessing social networking content, while allowing them to access other Internet content.

Particular embodiments may be implemented without the proxy server 130A or without one or more of the connections 135A, 145A, and 155A.

The HTML5 content server 150A may be, for example, a web server that includes HTML5 content (for example, a YouTube® server or any other such server known to one of ordinary skill in the art). HTML5 content may include video files or transparent HTML5 content. The HTML5 content server 150A is connected to the network 140A via a connection 105A. The connection 105A may be a HTTP or HTTPS connection.

HTTP may be used, for example, to fetch HTML5 content by the client computing device 110A. HTTPS may be used, for example, to get HTML5 content in a secure manner by the client computing device.

Figure 1B:
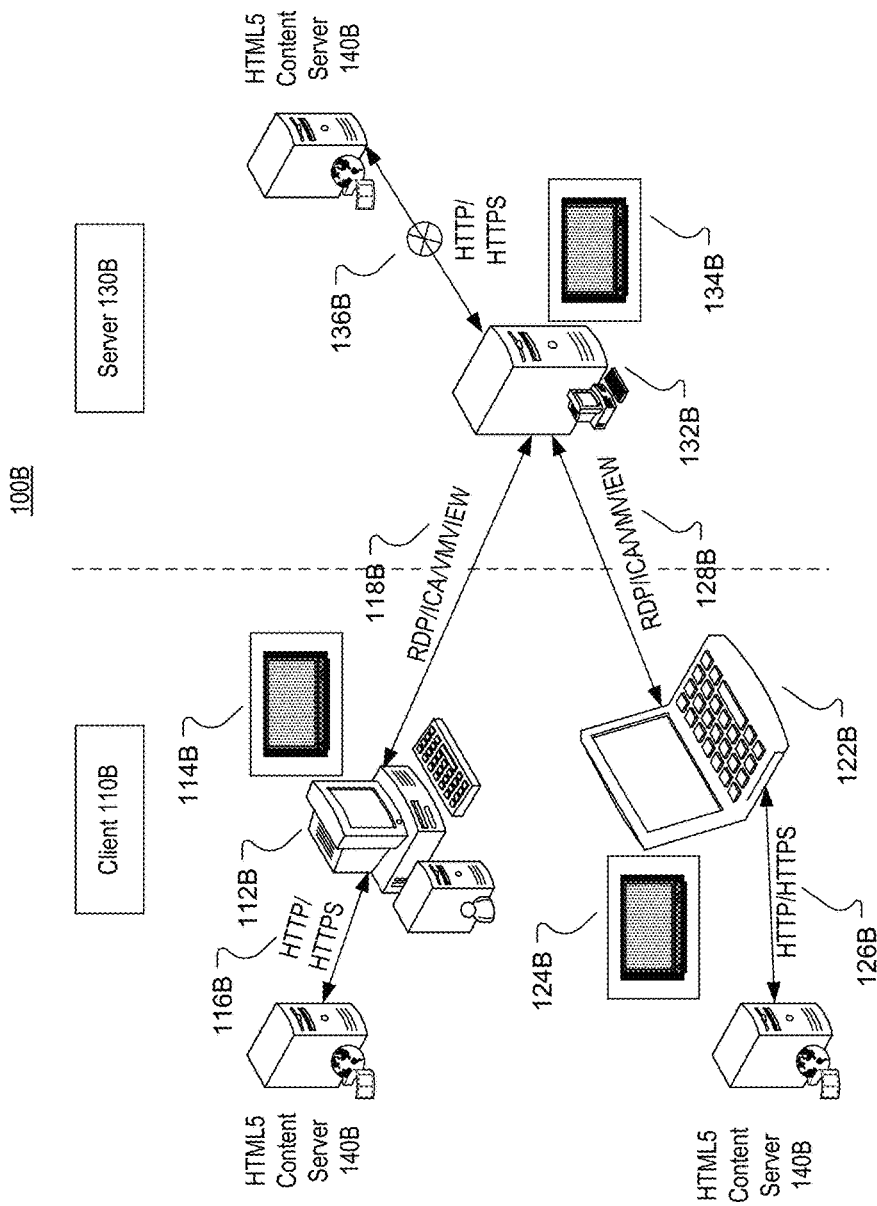
FIGS. 1B-1C illustrate examples of components of the first system for presenting HTML5 content of FIG. 1A.

FIG. 1B illustrates a system 100B that includes examples of components (110B, 112B, 114B, 116B, 118B, 122B, 124B, 126B, 128B, 130B, 132B, 134B, 136B, and 140B) of the first system 100A for presenting HTML5 content of FIG. 1A.

As shown in FIG. 1B, in one example embodiment, server 132B on server side 130B is displaying, via a remote desktop protocol server application, a webpage that includes HTML5 content 134B from HTML5 content server 140B. The server 132B is connected to clients 112B and 122B via a remote desktop protocol connection 118B and 128B (for example, Citrix ICA, RDP, ICA, or VMview). Each client 112B or 122B on client side 110B is connected to the HTML5 content server 140B via a hypertext transfer protocol (HTTP) connection 116B or 126B. The clients 112B or 122B receive the webpage as a bitmap via the remote desktop protocol connection 118B or 128B and the clients 112B or 122B receive the HTML5 content 114B or 124B via the HTTP connection 116B or 126B to the HTML5 content server 140B.

Figure 1C:
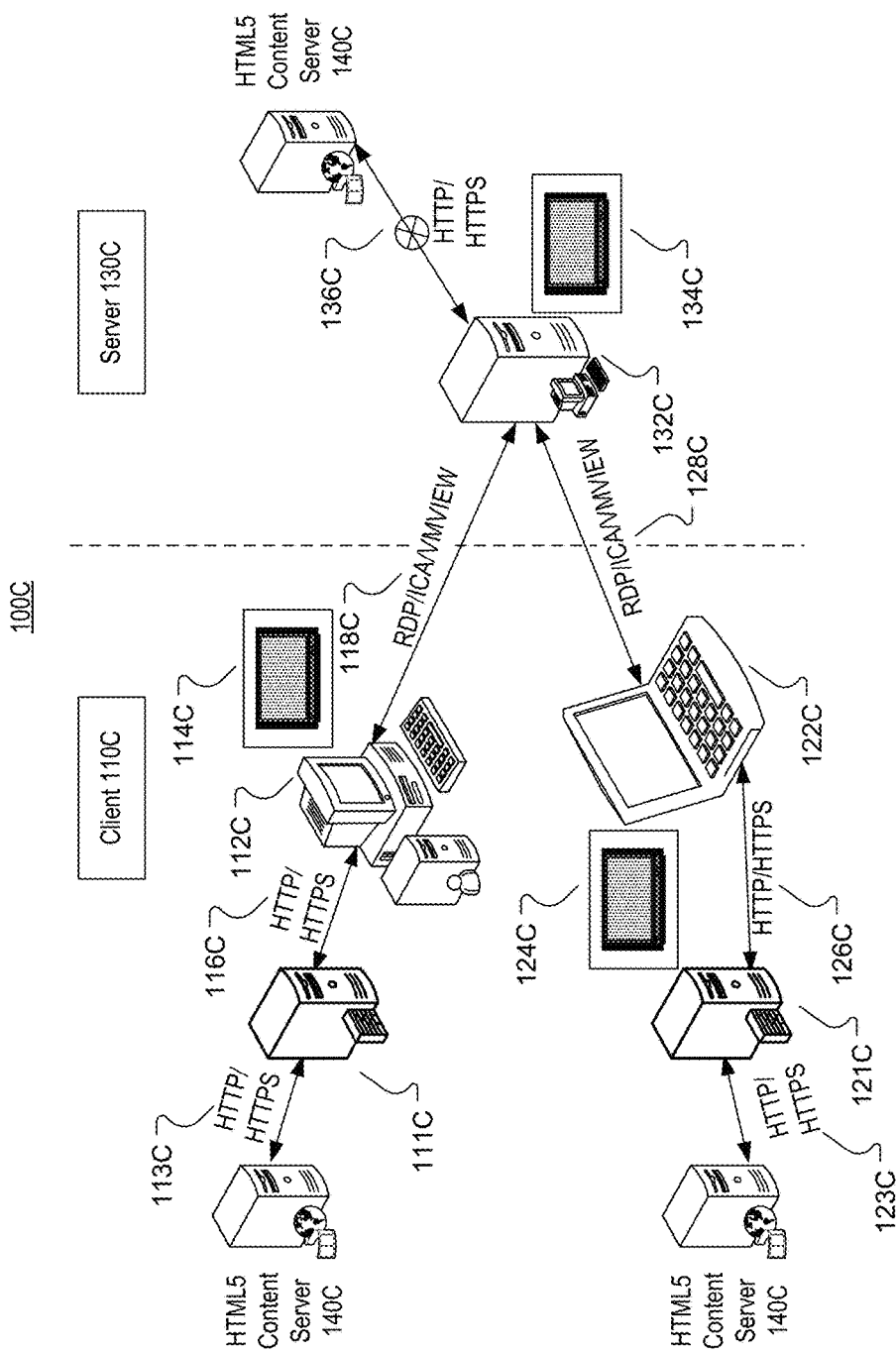

FIG. 1C illustrates a system 100C that includes examples of components (110C, 111C, 112C, 113C, 114C, 116C, 118C, 121C, 122C, 123C, 124C, 126C, 128C, 130C, 132C, 134C, 136C, and 140C) of the first system 100A for presenting HTML5 content of FIG. 1A.

As shown in FIG. 1C, in one example embodiment, server 132C on server side 130C is displaying, via a remote desktop protocol server application, a webpage that includes a HTML5 video 134C (or other HTML5 content item) from HTML5 content server 140C. The server 132C is connected to clients 112C and 132C via a remote desktop protocol connection 118C and 128C (for example, RDP, ICA, or VMview). Each client 112C or 122C on client side 110C is connected to a proxy server 111C or 121C via a HTTP connection 116C or 126C. Each proxy server 111C or 121C is connected to the HTML5 content server 140C via a HTTP connection 113C or 123C. The clients 112C or 122C receive the webpage via the remote desktop protocol connection 118C or 128C and the clients 112C or 122C receive the HTML5 content 114C or 124C via the HTTP connections 113C and 116C or 123C and 126C and over the proxy server 111C or 121C to the HTML5 content server 140C.

Figure 2A:
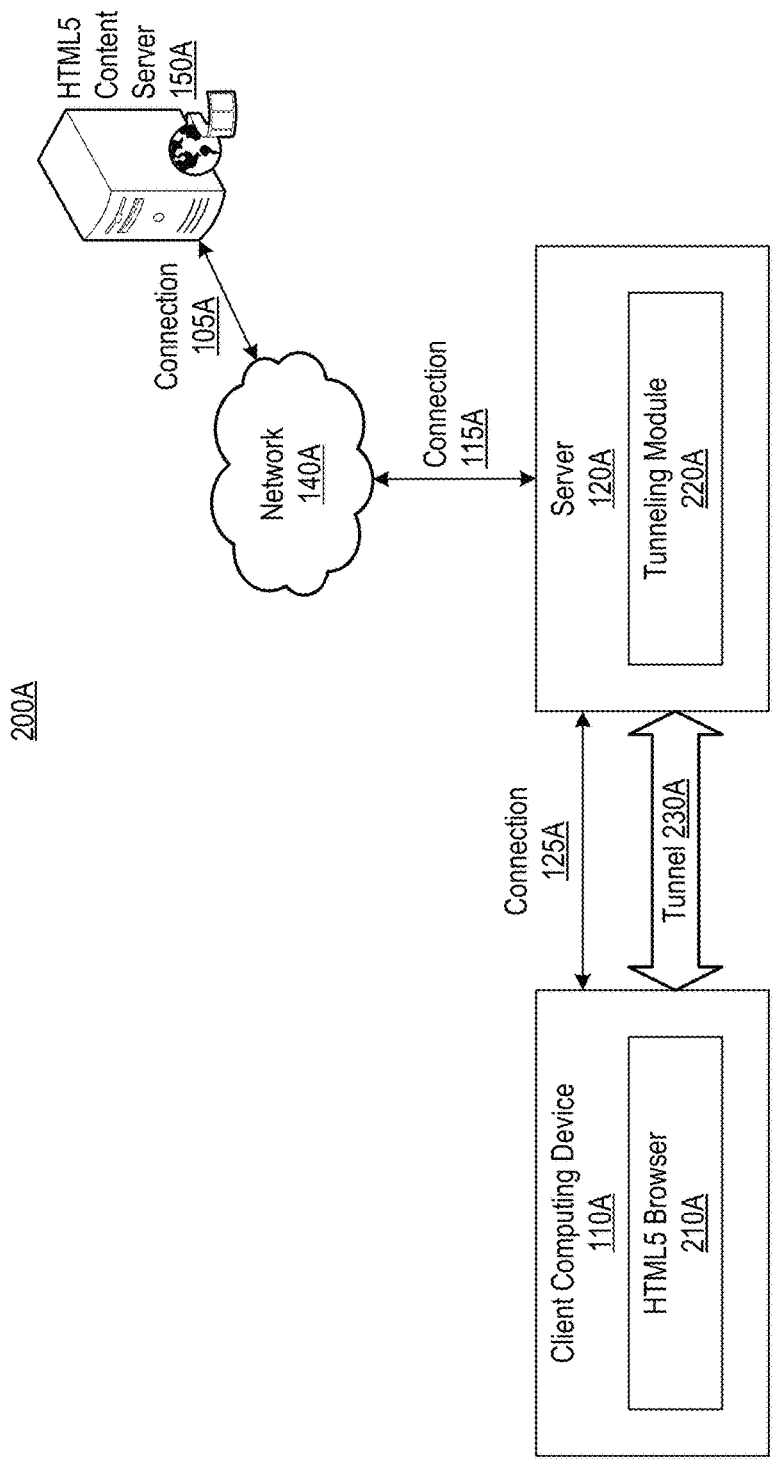
FIG. 2A is a block diagram illustrating an example of a second system for presenting HTML5 content.

FIG. 2A is a block diagram illustrating an example of a second system 200A for presenting HTML5 content. As shown, the system 200A includes the client computing device 110A, the server 120A, and the HTML5 content server 150A.

As illustrated, the client computing device 110A includes an HTML5 browser 210A. HTML5 browser 210A is any browser known to one of ordinary skill in the art for displaying HTML5 content from a webpage. Also, as illustrated, the client computing device 110A is not directly connected to the network 140A. Instead, the client computing device 110A is configured to access the network via the connection 125A to the server and the connection 115A of the server to the network.

The connection 125A between the client computing device 110A and the server 120A may be a remote desktop protocol connection. The client computing device 110A may transmit to the server 120A user interface data (for example, mouse operations and keyboard clicks entered by a user of the client computing device) via the connection 125A. The server 120A may transmit to the client computing device 110A a bitmap including image data to be displayed on a display unit (for example, a screen) of the client computing device 110A via the connection 125A.

As illustrated, the server 120A includes a tunneling module 220A. The tunneling module may be configured to, in an event that the server 120A is connected to the client computing device 110A via a connection 125A (for example, a remote desktop protocol connection) and a web browser executing on the server 120A and displayed on the client computing device 110A via a remote desktop protocol client application is accessing an HTML5 content item, create a tunnel 230A. The tunnel 230A may be configured to transmit HTML5 content from the server 120A to the client 110A as HTML5 data, rather than streaming. That is, the HTML5 content may be sent without first being decoded.

The HTML5 content may be received at the server 120A from the HTML5 content server 150A via the network 140A. The server 120A may be connected with the HTML5 content server 150A via connections 115A and 105A.

Figure 2B:
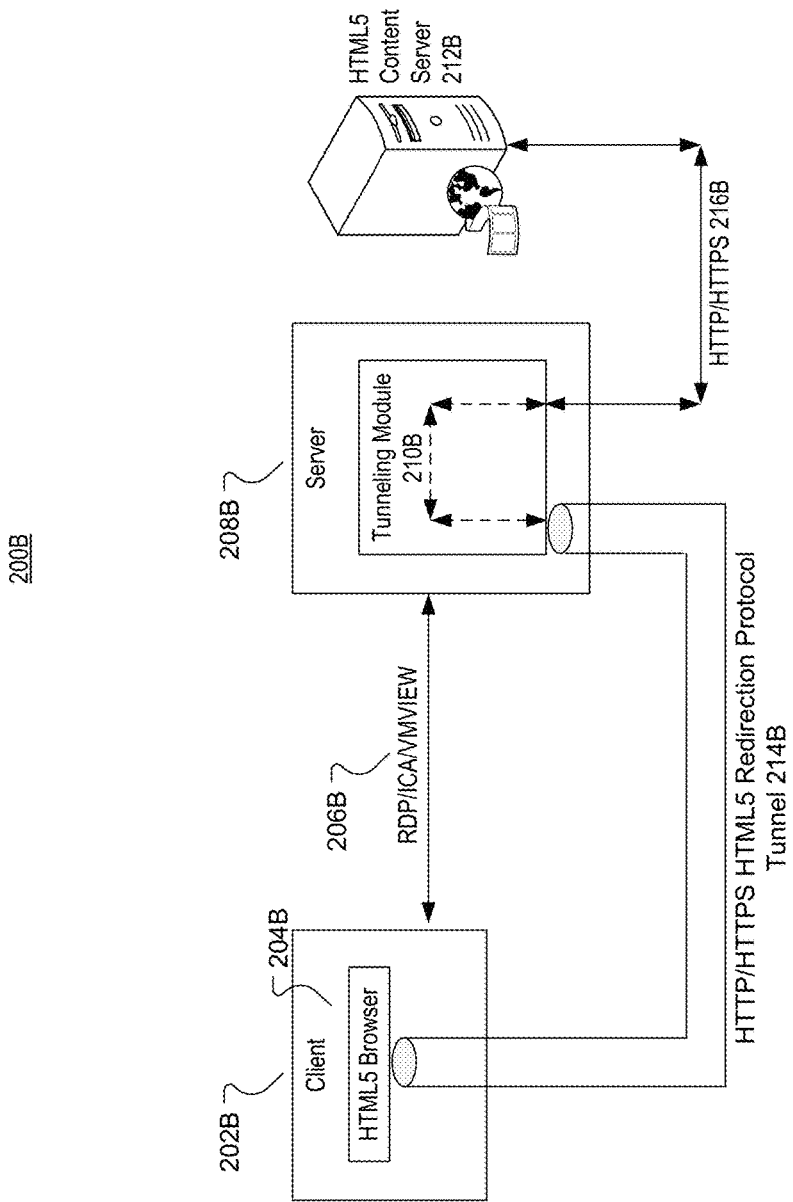
FIG. 2B illustrates examples of components of the second system for presenting HTML5 content of FIG. 2A.

FIG. 2B illustrates a system 200B that includes examples of components (202B, 204B, 206B, 208B, 210B, 212B, 214B, and 216B) of the second system 200A for presenting HTML5 content of FIG. 2A. Client 202B includes an HTML browser 204B where HTML browser 204B is any browser known to one of ordinary skill in the art for displaying/playing HTML5 content. Server 212B may host webpages that contain HTML5 content and may send that content via HTTP/HTTPS 216B through a tunneling module 210B of server 208B. Server 208B communicates with client 202B via any protocol known to one of ordinary skill in the art for transmitting data to/from a remote session, for example, via RDP/ICA/VMVIEW.

Figure 3:
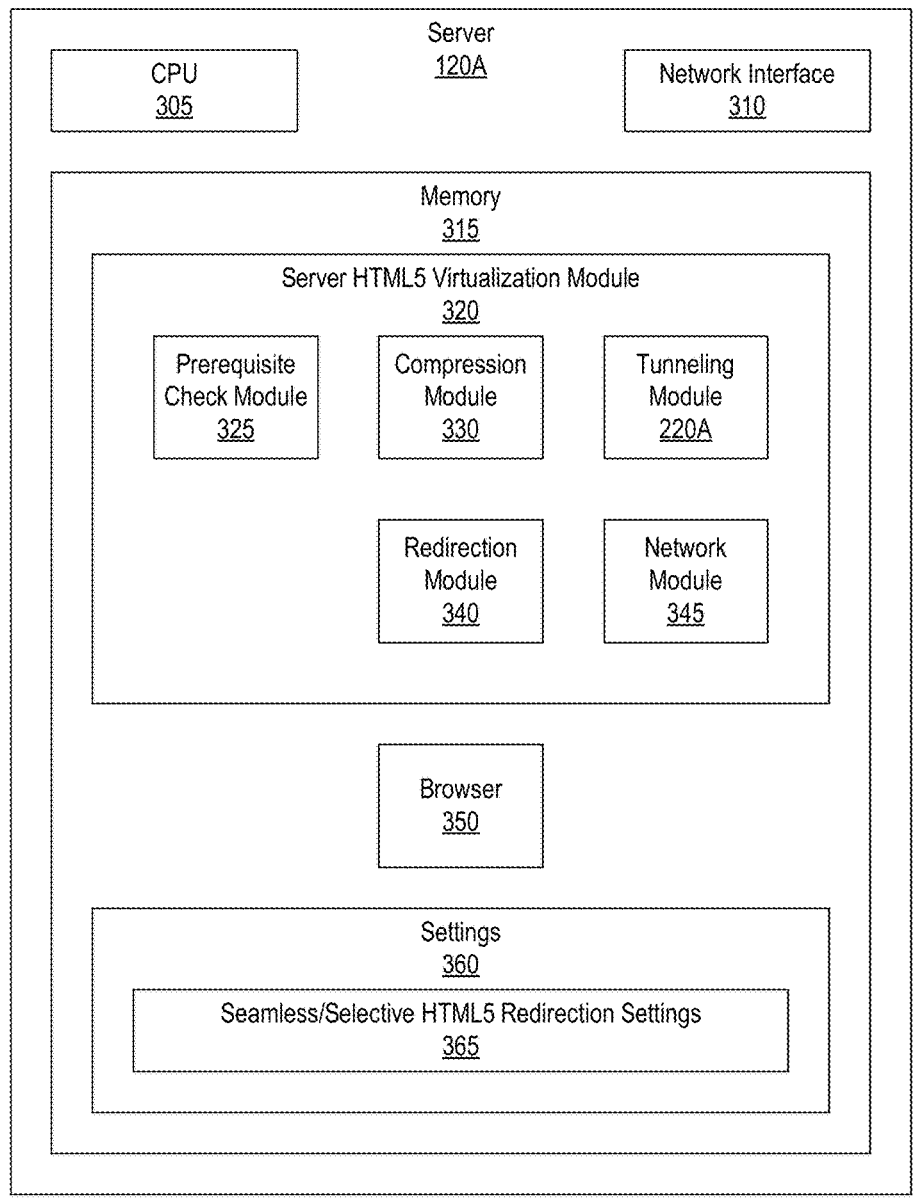
FIG. 3 is a block diagram illustrating an example of the server of FIG. 1A or 2A.

FIG. 3 is a block diagram illustrating an example of the server 120A.

As shown, the server 120A includes a central processing unit (CPU) 305, a network interface 310, and a memory 315. The CPU 305 may include one or more processors configured to execute computer instructions or modules that are stored in a computer-readable medium, for example, the memory 315. The network interface 310 may be configured to allow the server 120A to transmit and receive data in a network, for example, network 140A of FIG. 1A. The network interface 310 may include one or more network interface cards (NICs). The memory 315 stores data or instructions. The memory 315 may be one or more of a cache unit, a storage unit, an internal memory unit, or an external memory unit. As illustrated, the memory 315 includes a server HTML5 virtualization module 320, a browser 350, and settings 360.

As illustrated, the server HTML5 virtualization module 320 includes a prerequisite check module 325, a compression module 330, the tunneling module 220A, an acceleration module 335, a redirection module 340, and a network module 345. In particular embodiments, redirection module 340 includes an HTML5 content redirection proxy plugin, which may support the function of displaying HTML5 content at client computing device 110A that depend on scripts (for example, JavaScript). The proxy plugin may, for example, work to redirect HTML5 content from the browser 350 of the server to the browser of the client. An example of an operation of the server HTML5 virtualization module 320 and the components 325, 330, 220A, 335, 340, and 345 thereof is provided in conjunction with FIG. 8.

The browser 350 is configured to provide data from webpages for display at a client (for example, client computing device 110A) via a remote desktop protocol client application executing at the client. Some of the webpages may include HTML5 content. Example browsers that may correspond to browser 350 include Microsoft Internet Explorer®, Mozilla Firefox®, or Google Chrome Browser®.

The settings 360 include settings of the server 120A. As shown, the settings 360 include seamless or selective HTML5 redirection settings 365. At any time, the seamless or selective HTML5 redirection settings 365 indicate either (a) seamless HTML5 content redirection or (b) selective HTML5 content redirection. Under seamless HTML5 content redirection, all HTML5 content from a webpage viewed in the browser 350 during a remote desktop protocol session with a client is redirected to the client for displaying on HTML5 browser 210A of the client. Under selective HTML5 content redirection, HTML5 content selected by a user of the client (for example, via operation of a mouse on the client) is redirected to the client for displaying in the HTML5 browser 210A of the client.

Figure 4:
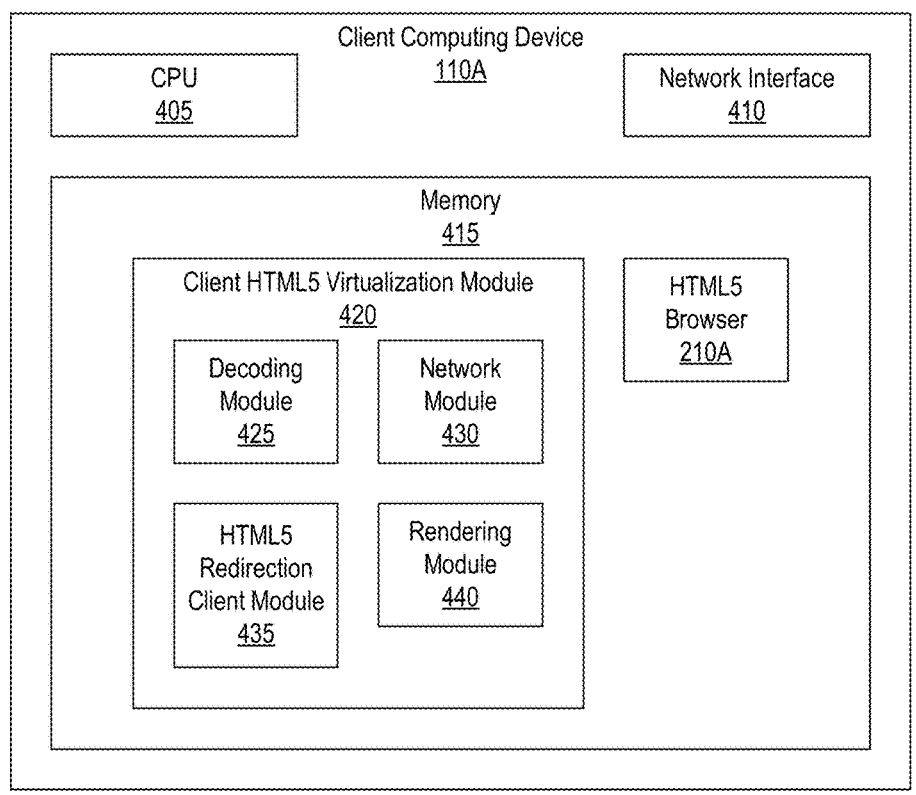
FIG. 4 is a block diagram illustrating an example of the client computing device of FIG. 1A or 2A.

FIG. 4 is a block diagram illustrating an example of the client computing device 110A.

As shown, the client computing device 110A includes a central processing unit (CPU) 405, a network interface 410, and a memory 415. The CPU 405 may include one or more processors configured to execute computer instructions that are stored in a computer-readable medium, for example, the memory 415. The network interface 410 is configured to allow the client computing device 110A to transmit and receive data in a network, for example, network 140A of FIG. 1A. The network interface 410 may include one or more network interface cards (NICs). The memory 415 stores data or instructions. The memory 415 may be one or more of a cache unit, a storage unit, an internal memory unit, or an external memory unit. As illustrated, the memory 415 includes a client HTML5 virtualization module 420 and an HTML5 Browser 210A.

As illustrated, the client HTML5 virtualization module 420 includes a decoding module 425, a network module 430, an HTML5 redirection client module 435, and a rendering module 440. In particular embodiments, HTML5 redirection client module 435 includes an HTML5 redirection proxy browser. An example of an operation of the client HTML5 virtualization module 420 and the components 425, 430, 435, and 440 thereof is provided in conjunction with FIG. 9.

As illustrated, the memory 415 of the client computing device 110A also includes an HTML5 browser 210A. The HTML5 browser 210A is configured to play/display HTML5 content received at the client computing device 110A, for example, via the tunnel 230A, via the connection 135A to the network 140A, or via the connection 145A to the proxy server 130A. The HTML5 browser 210A may be any browser known to one of ordinary skill in the art for displaying/playing HTML5 content.

Figure 5:
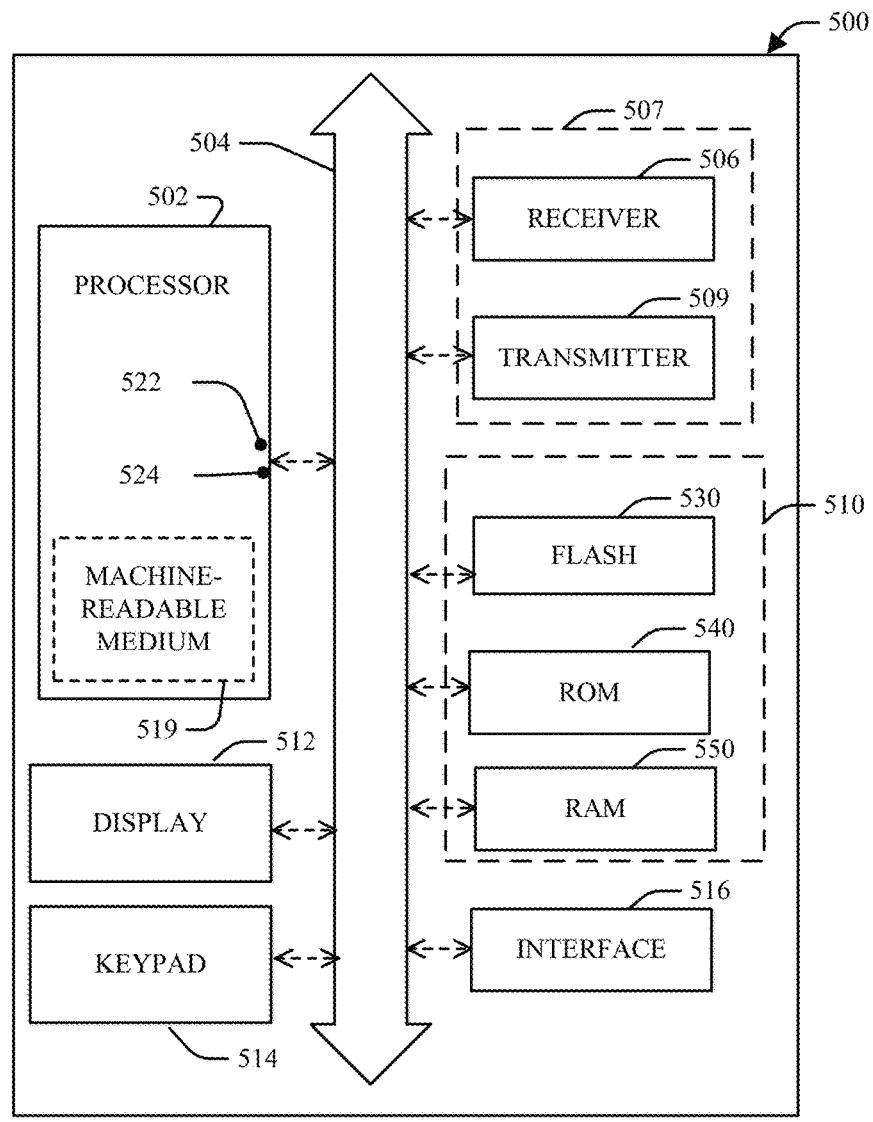
FIG. 5 is a conceptual block diagram illustrating an example of a computing device.

FIG. 5 is a conceptual block diagram illustrating an example of a computing device or information handling system.

A computing device 500 may be, for example, a client computing device 110A, a server 120A, a proxy server 130A, or an HTML5 content server 150A. A computing device may comprise one or more computing devices.

A computing device 500 may include a processor 502. The processor 502 may include one or more processors. The processor 502 is capable of communication with a receiver 506 and a transmitter 508 through a bus 504 or other structures or devices. It should be understood that communication means other than busses may be utilized with the disclosed configurations. The processor 502 may generate commands, messages, and/or other types of data to be provided to the transmitter 509 for communication. In addition, commands, messages, and/or other types of data may be received at the receiver 506, and processed by the processor 502.

The processor 502 may operate in conjunction with a general-purpose processor or a specific-purpose processor for executing instructions and may further include a machine-readable medium 519 for storing data and/or instructions for software programs. The instructions, which may be stored in a machine-readable medium 510 and/or 519, are executable by the processor 502 to control and manage access to the various networks, as well as provide other communication and processing functions. The instructions may comprise one or more modules. The instructions may also include instructions executable by the processor 502 for various user interface devices, such as a display 512 and a keypad 514. The processor 502 may include an input port 522 and an output port 524. Each of the input port 522 and the output port 524 may include one or more ports. The input port 522 and the output port 524 may be the same port (for example, a bi-directional port) or may be different ports.

The processor 502 may be implemented using software, hardware, or a combination of both. By way of example, the processor 502 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that may perform calculations or other manipulations of information. Those skilled in the art will recognize how best to implement the described functionality for the processor 502.

Software shall be construed broadly to mean instructions, data, modules, or any combination thereof, whether referred to as software, firmware, middleware, microcode, hardware description language, or otherwise. Instructions may include code (for example, in source code format, binary code format, executable code format, or any other suitable format of code). Instructions may be executable, for example, by a computing device (for example, a client computing device, an HTTP server, a web server) or by a processing system (for example, an operating system, an HTTP server, or a web server). Instructions may be, for example, a computer program including code.

A machine-readable medium may be one or more machine-readable media. A machine-readable medium (for example, 510) may include storage external to an operating system, such as a random access memory (RAM) 550, a flash memory 530, a read only memory (ROM) 540, a programmable read-only memory (PROM), an erasable PROM (EPROM), registers, a hard disk, a removable disk, a CD-ROM, a DVD, or any other suitable storage device. A machine-readable medium 519 may also have a volatile memory and a non-volatile memory. The machine-readable medium 519 may be a non-transitory machine-readable medium. A non-transitory machine-readable medium may include one or more volatile and/or non-volatile memories. A machine-readable medium 519 may include storage integrated into a processing system, such as might be the case with an application specific integrated circuit (ASIC). A memory may be a machine-readable medium (for example, 510 or 519) or a part thereof.

According to one aspect of the disclosure, a machine-readable medium is a computer-readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a non-transitory machine-readable medium is a computer-readable medium, a non-transitory computer-readable medium, a computer-readable storage medium, or a non-transitory computer-readable storage medium.

An interface 516 may be any type of interface and may reside between any of the components shown in FIG. 5. An interface 516 may also be, for example, an interface to the outside world (for example, an Internet network interface). A transceiver block 507 may represent one or more transceivers, and each transceiver may include a receiver 506 and a transmitter 509. A functionality implemented in a processor 502 may be implemented in a portion of a receiver 506, a portion of a transmitter 509, a portion of a machine-readable medium 510, a portion of a display 512, a portion of a keypad 514, or a portion of an interface 516, and vice versa. In one aspect, a computing device may include only some or all of the elements shown in FIG. 5. A computing device may include other elements not shown in FIG. 5. A computing device may include more than one of the same elements.

Figure 6:
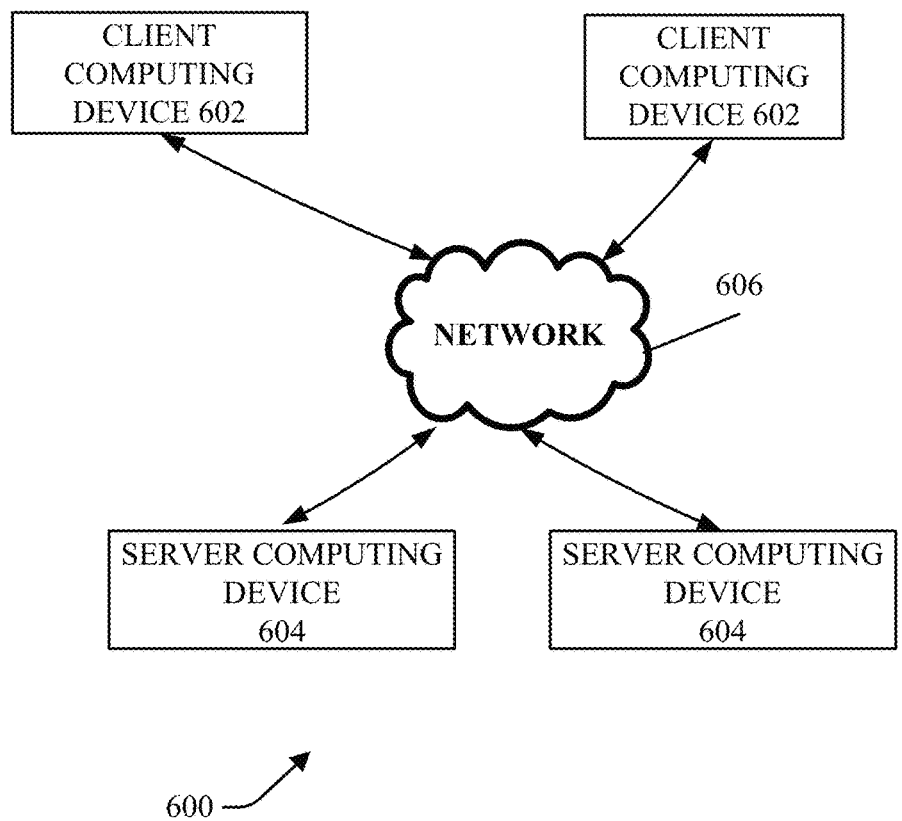
FIG. 6 illustrates a simplified diagram of an example of a network system.

FIG. 6 illustrates a simplified diagram of an example of a computer network system in accordance with an aspect of the present disclosure.

A computer network system 600 may include one or more client computing devices 602 (for example, laptop computers, desktop computers, tablets, PDAs, mobile phones, etc.) in communication with one or more server computing devices 604 (for example, a server such as an HTTP server, a web server, an enterprise server, etc.) via a network 606. In one aspect, server computing device 604 may be physically located in one country or geographic region while client computing device 602 is located in a different country or geographic region. In one aspect, a server computing device 604 is configured to allow remote sessions (for example, remote desktop sessions) wherein users may access applications and files on the server computing device 604 by logging onto the server computing device 604 from a client computing device 602. Such a connection may be established using any of several well-known techniques such as the remote desktop protocol (RDP) on a Windows-based server or the techniques disclosed herein for a non-Windows-based server.

In one aspect, a client computing device 602 may be an end-user computing device, such as a laptop or desktop computer. The client computing device 602 may correspond to the client computing device 110A of FIG. 1A. In one aspect, a server computing device 604 may correspond to one or more of the server 120A, the proxy server 130A, or the HTML5 content server 150A of FIG. 1A.

By way of illustration and not limitation, a client computing device 602 may represent a computer, a mobile phone, a laptop computer, a tablet, a thin computing device, a personal digital assistant (PDA), a portable computing device, a virtual machine, or a suitable device with a processor. In one example, a client computing device 602 is a smart phone (for example, iPhone, Android phone, Blackberry, etc.). In certain configurations, a client computing device 602 may represent an audio player, a game console, a camera, a camcorder, an audio device, a video device, a multimedia device, or a device capable of supporting a connection to a remote computing device. In an example, a client computing device 602 is mobile. In another example, a client computing device 602 is a hand-held device. In another example, a client computing device 602 may be stationary. In one example, a client computing device 602 may be a device having at least a processor and memory, where the total amount of memory of the client computing device 602 is less than the total amount of memory in a server computing device 604. In an example, a client computing device 602 does not have a hard disk. In one example, a client computing device 602 has a display smaller than a display supported by a server computing device 604.

In one aspect, a server computing device 604 may represent a computer, a laptop computer, a computing device, a virtual machine (for example, VMware® Virtual Machine), a desktop session (for example, Microsoft Terminal Server), a published application (for example, Microsoft Terminal Server) or a suitable device with a processor. In one aspect, a server computing device 604 may be stationary. In another aspect, a server computing device 604 may be mobile. In certain configurations, a server computing device 604 may be any device that may represent a computing device. In one aspect, a server computing device 604 may include one or more computing devices.

In one example, a first device is remote to a second device when the first device is not directly connected to the second device. In one example, a first remote device may be connected to a second device over a communication network such as a Local Area Network (LAN), a Wide Area Network (WAN), and/or other network known to one of ordinary skill in the art.

When a client computing device 602 and a server computing device 604 are remote with respect to each other, a client computing device 602 may connect to a server computing device 604 over a network 606, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 606 may be a LAN network, a WAN network, a wireless network, the Internet, an intranet or other network. A remote device (for example, a computing device) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the present disclosure is not limited to these examples.

Figure 7:
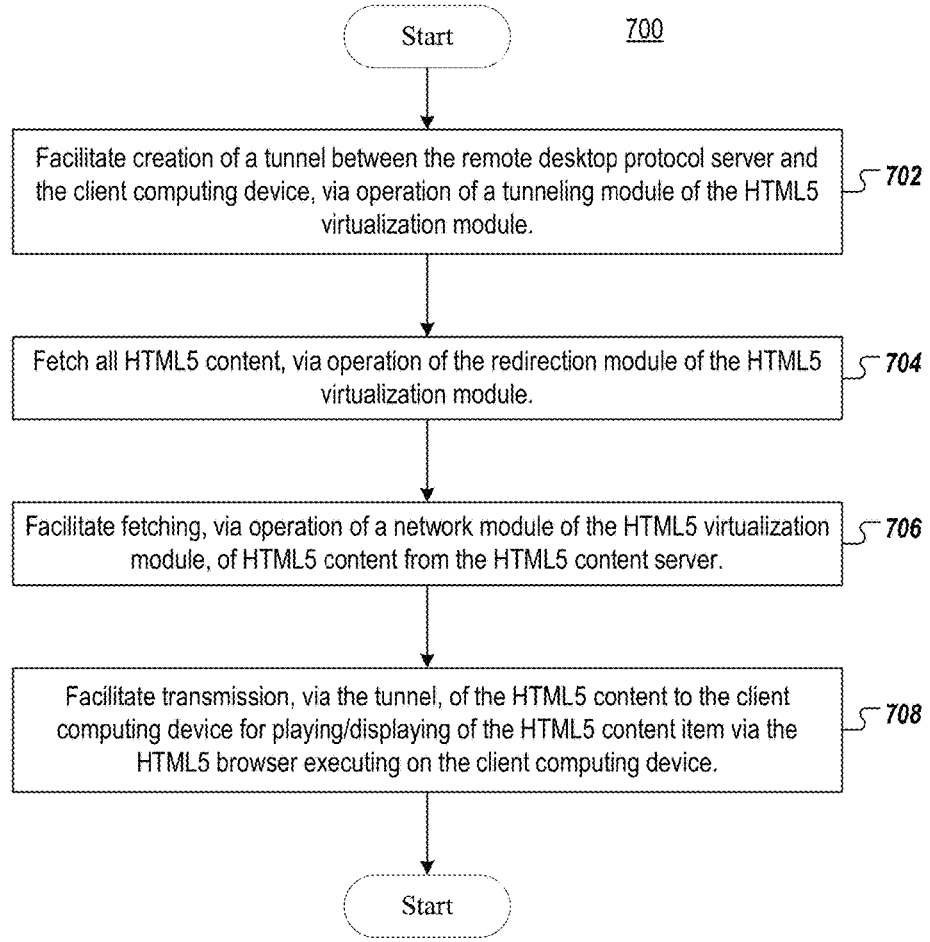
FIG. 7 is a flow chart illustrating an example of operation of the server for presenting HTML5 content.

FIG. 7 is a flow chart illustrating an example process 700 of an operation of the server for presenting HTML5 content.

With reference to FIG. 7, the HTML5 redirection begins at operation 702, where the remote desktop protocol server facilitates creation of a tunnel (for example, tunnel 230A) between the remote desktop protocol server and the client computing device, via operation of a tunneling module (for example, Tunneling Module 220A) of the HTML5 virtualization module (for example, server HTML5 virtualization module 320). Upon creation of the tunnel, the remote desktop protocol server may be connected to the client computing device via both the tunnel and the remote desktop protocol connection (for example, connection 125A). The tunnel may be different from the remote desktop protocol connection.

In operation 704, the remote desktop protocol server fetches all HTML5 content, via operation of the redirection module (for example, redirection module 340) of the HTML5 virtualization module.

In operation 706, the remote desktop protocol server facilitates fetching, via operation of the network module (for example, Network Module 345) of the HTML5 virtualization module, of HTML5 content item from the HTML5 content server. The HTML5 content may include, for example, a video.

In operation 708, the remote desktop protocol server facilitates transmission, via the tunnel, of the HTML5 content to the client computing device for displaying of the HTML5 content via the HTML5 browser (for example, HTML5 browser 210A) executing on the client computing device. The client computing device may receive the HTML5 content. On the client computing device, the HTML5 redirection client module (for example, HTML5 redirection client module 435) may instantiate the HTML5 browser (for example, HTML5 browser 210A) in a position of a display overlaying the browser of the remote desktop protocol client application. The position of the display may overlay the image data associated with the webpage. The HTML5 browser on the client computing device may play/display the HTML5 content in response to receipt of the HTML5 content. After operation 708, the process 700 ends.

Figure 8:
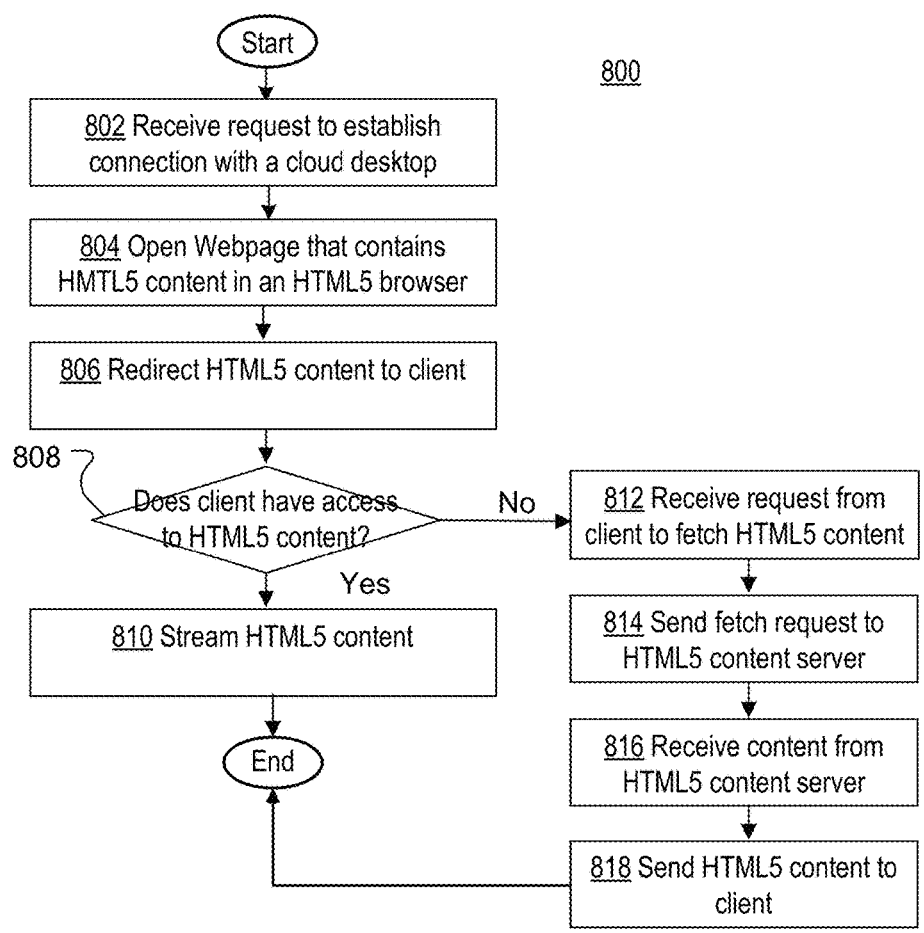
FIG. 8 is a flow chart illustrating an example of an operation of the server.

One example of a process 800 for presenting HTML5 content is illustrated in FIG. 8. At operation 802, a request is received by a server 120A to establish connection with a cloud desktop. At step 804, the server 120A opens or loads a webpage that includes HTML5 content that has been requested by the client 110A. At step 806, the server 120A redirects the HTML5 content to the client 110A requesting the HTML5 content. At step 808, it is determined if the client 110A has access to the HTML5 content. If the client 110A does have access then the HTML5 is streamed to the client 110A at step 810. If the client 110A does not have access to the HTML5 content, then at step 812, the server 120A receives a request from the client 110A for the server 120A to fetch the HTML5 contents from the HTML5 content server, for example, HTML5 content server 150A. At step 814, the server 150A sends the fetch request to the HTML5 content server 150A. At step 816, the server 150A receives the requested HTML5 content from the HTML5 content server 150A. At step 818, the server 120A sends the HTML5 content fetched from the HTML5 content server 150A to the client 110A.

In one embodiment, the client 110A may first attempt to fetch the HTML5 content directly from the HTML5 content server 150A. If the client 110A is denied access to the HTML5 content dues to geographical restrictions, the client 110A may request that the server 120A fetch the HTML5 contents from the HTML5 content server 150A as in step 812 through step 818.

In one embodiment, a client does not have access to HTTP and/or HTTPS. Rather, the client only has access to RDP, for example, in a fully secured network configuration. In this embodiment, the method would begin at step 812 where the server 120A would from the beginning receive a request from the client 110A for the HTML5 content to be fetched by the HTML5 content server 150A.

Figure 9:
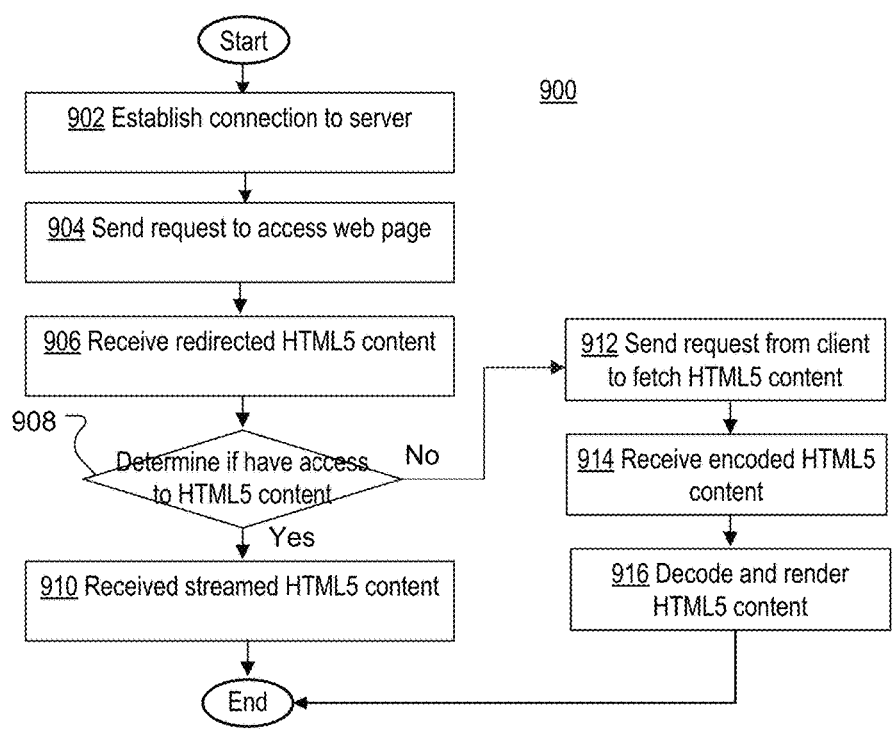
FIG. 9 is a flow chart illustrating examples of operations of the client.

One example of a process 900 for receiving HTML5 content is illustrated in FIG. 9. At step 902, a client 110A establishes a connection with a server 120A. At step 904, the client 110A sends a request to access (or retrieve the contents of) a web page. At step 906, the client 110A receives the redirected HTML5 content from the server 120A (which may have received the HTML5 content from an HTML5 content server 150A). At step 908, it is determined if the client 110A can access the HTML5 content from the website. That is, it is determined if the HTML5 content received was actual content or denial of access of content. For example, if HTML5 content from a website has been restricted for the client 110A because of the geographic location of the client 110A, then the received HTML5 content may not contain any of the actual content from the website or may not even be HTML 5 content but rather some other type of data indicative of restricted access. If the client 110 can access the HTML5 content then at step 910 the client 110A receives the streamed HTML5 contented from the requested website.

If the client 110A cannot access the HTML5 content, for example, due to geographic restrictions, then at step 912, the client 110A sends a fetch request for the HTML5 content. According to the network configuration, the request may be sent to the HTML5 content server 150A directly. In one embodiment, the request is sent from the client 110A to the server 120A which fetches the HTML5 content from the HTML5 content server 150A. In this embodiment, the server 120A, a hosted cloud server, works like a tunneling server. The server 120A does not process the HTML5 content, for example, no decoding or rendering of the HTML5 content by the server 120A is performed. At step 914, the client 110A receives the encoded HTML5 content either directly from the HTML5 content server 150A or through a server 120A or from any other network connection known to one of ordinary skill in the art. At step 916, the client 110A decodes the HTML5 content and renders the HTML5 content for display at the client 110A, for example, via HTML5 browser 210A and display 512.

A client or client computing device may be, for example, a client implementing a Wyse TCX® client application (or any similar remote desktop protocol client application), and a server or remote desktop server may be, for example, a server implementing a Wyse TCX® server application (or any similar remote desktop protocol server application).

In one embodiment, a client does not have access to HTTP and/or HTTPS. Rather, the client only has access to RDP, for example, in a fully secured network configuration. In this embodiment, the method would begin at step 912 where the client 110A would from the beginning send a request to the server 120A for the HTML5 content to be fetched by the HTML5 content server 150A. In one aspect, any of the clauses herein may depend from any one of the independent clauses or any one of the dependent clauses. In one aspect, any of the clauses (for example, dependent or independent clauses) may be combined with any other clauses (for example, dependent or independent clauses). In one aspect, a claim may include some or all of the words (for example, steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (for example, software or hardware) described or claimed herein can be represented in drawings (for example, flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (for example, means for performing an action) such that each means-for element can be represented as a module for element (for example, a module for performing an action).

Those of skill in the art would appreciate that items such as the various illustrative blocks, modules, elements, components, methods, operations, steps, and algorithms described herein (for example, the client computing device 110A, the server 120A, the proxy server 130A, the HTML5 content server 150A, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, one or more modules that include instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.). Those skilled in the art will recognize how to implement the instructions, circuits, and processing systems.

A reference to an element in the singular is not intended to mean "one and only one" unless specifically so stated, but rather "one or more." For example, a server may refer to one or more servers, a tunnel may refer to one or more tunnels, a connection may refer to one or more connections, etc.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect of the disclosure, when actions or functions are described as being performed by an item (for example, receiving, determining, fetching, creating, providing, generating, converting, displaying, playing, notifying, accepting, selecting, controlling, transmitting, reporting, sending, or any other action or function), it is understood that such actions or functions may be performed by the item directly or indirectly. In one aspect, when a module is described as performing an action, the module may be understood to perform the action directly. In one aspect, when a module is described as performing an action, the module may be understood to perform the action indirectly, for example, by facilitating, enabling or causing such an action.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Various items may be arranged differently (for example, arranged in a different order, or partitioned in a different way) all without departing from the scope of the subject technology. In one example, the subject technology may be implemented without use of the proxy server 130A or without use of the tunnel 230A. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, by a server, a request by a client to establish a connection to the server, wherein the connection comprises at least a tunnel and a remote desktop protocol connection;
   receiving, by the server, a request for hypertext extensive markup language (HTML) 5 content for a particular website from the client;
   loading, by the server, in a browser executing on the server and displayed on the client, a webpage comprising HTML5 content associated with the request for HTML5 content for the particular website;
   redirecting, by the server, the HTML5 content of the webpage loaded in the browser of the server to the client, wherein the HTML5 content is encoded;
   determining if the client is restricted from rendering the HTML5 content based, at least in part, on a physical geographic location of the client;
   receiving, by the server, a fetch request for encoded HTML5 content from the client;
   fetching, by the server, the encoded HTML5 content for the webpage; and
   sending the encoded HTML5 content to the client, wherein the HTML5 content comprises a plurality of HTML5 content items of the webpage.

2. The method of claim 1, wherein the HTML5 content is fetched from an HTML5 content server by the server.

3. The method of claim 2, wherein the HTML5 content server is located in a different geographic region from the client.

4. The method of claim 1, wherein the HTML5 content comprises video.

5. The method of claim 1, wherein the connection is a remote desktop connection.

6. The method of claim 1, wherein the server and the client are located in different geographic regions.

7. A method comprising:
   requesting, at a client, a connection to a server, wherein the connection comprises at least a tunnel and a remote desktop protocol connection;
   requesting, by the client, hypertext extensive markup language (HTML)5 content for a particular webpage from a server, wherein the HTML5 content comprises a plurality of HTML5 content items of the webpage;
   requesting an HTML5 redirection browser at the client to display HTML5 content;
   receiving redirected HTML5 content at the client from a browser executing on the server that has loaded the particular webpage comprising the requested HTML5 content;
   determining, at the client, if the client has access to the HTML5 content based, at least in part, on a physical geographic location of the client;
   sending a request, by the client, for the server to fetch encoded HTML5 content;
   receiving at the client the encoded HTML5 content; and
   decoding and rendering the HTML5 content at the client, wherein decoding and rendering the HTML5 content comprises displaying the HTML5 content at the client.

8. The method of claim 7, wherein the HTML5 content is received from an HTML5 content server by the server.

9. The method of claim 8, wherein the HTML5 content server is located in a different geographic region from the client.

10. The method of claim 7, wherein the HTML5 content comprises video.

11. The method of claim 7, wherein the connection is a remote desktop connection.

12. The method of claim 7, wherein the server and the client are located in different geographic regions.

13. One or more computer-readable non-transitory storage media embodying software that is operable when executed to:
   receive, by a server, a request by a client to establish a connection to the server, wherein the connection comprises at least a tunnel and a remote desktop protocol connection;
   receive, by the server, a request for hypertext extensive markup language (HTML)5 content for a particular website from the client, wherein the HTML5 content comprises a plurality of HTML5 content items of the webpage;
   load, by the server, in a browser, executing on the server and for displaying on the client, a webpage comprising HTML5 content associated with the request for HTML5 content for the particular website;

redirect, by the server, the HTML5 content of the webpage loaded in the browser of the server to the client;

determine if the client is restricted from rendering the HTML5 content based, at least in part, on a physical geographic location of the client;

receive, by the server, a fetch request for encoded HTML5 content from the client;

fetch, by the server, the encoded HTML5 content for the webpage; and send the encoded HTML5 content to the client for decoding and displaying at the client.

14. The media of claim 13, wherein the HTML5 content is received from an HTML5 content server by the server.

15. The media of claim 14, wherein the HTML5 content server is located in a different geographic region from the client.

16. The media of claim 13, wherein the HTML5 content comprises video.

17. The media of claim 13, wherein the connection is a remote desktop connection.

* * * * *